No. 660,109. Patented Oct. 23, 1900.
S. C. HORN & W. S. SMITH.
ICE CREAM FREEZER.
(Application filed July 11, 1900.)
(No Model.) 2 Sheets—Sheet 2.
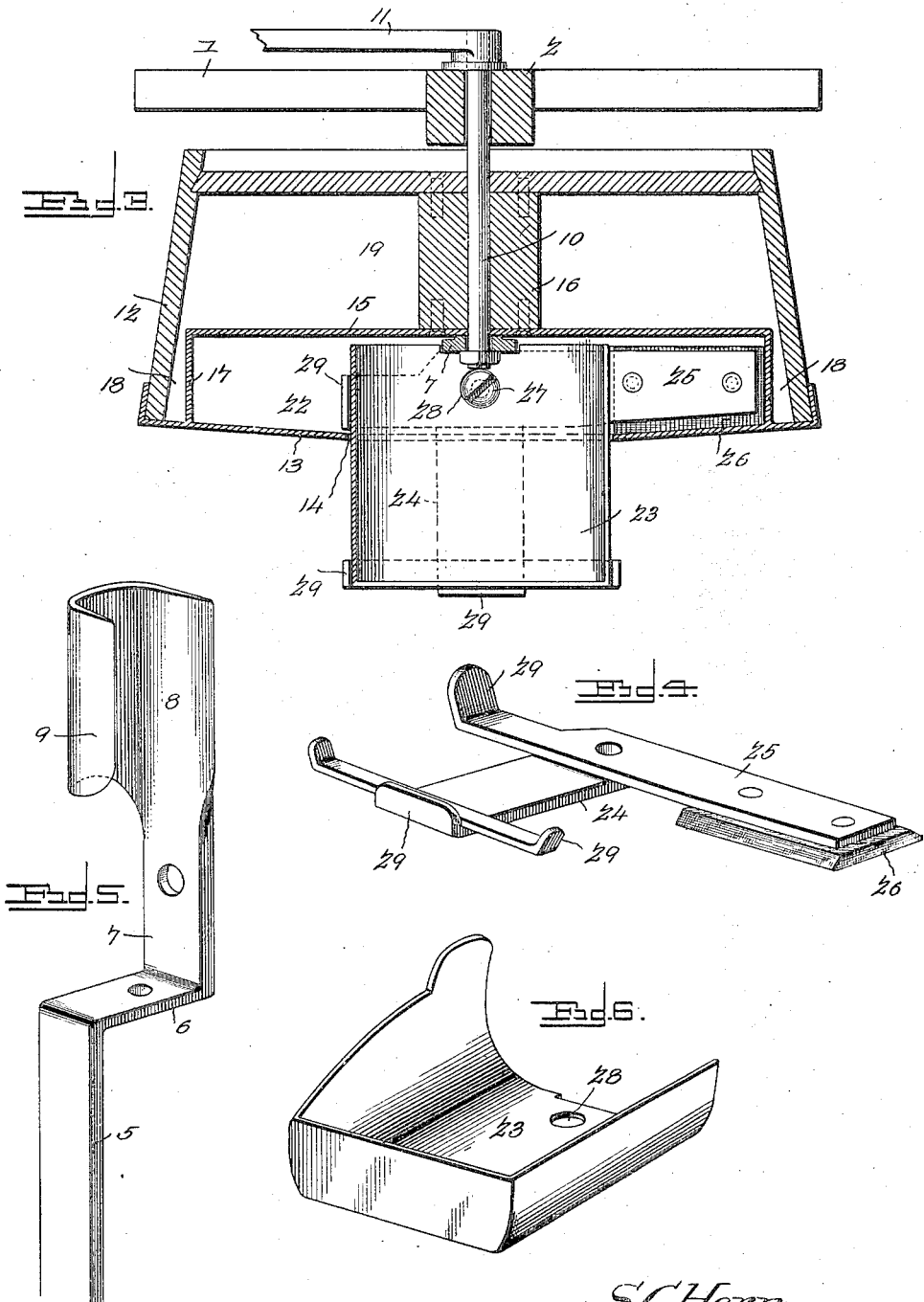

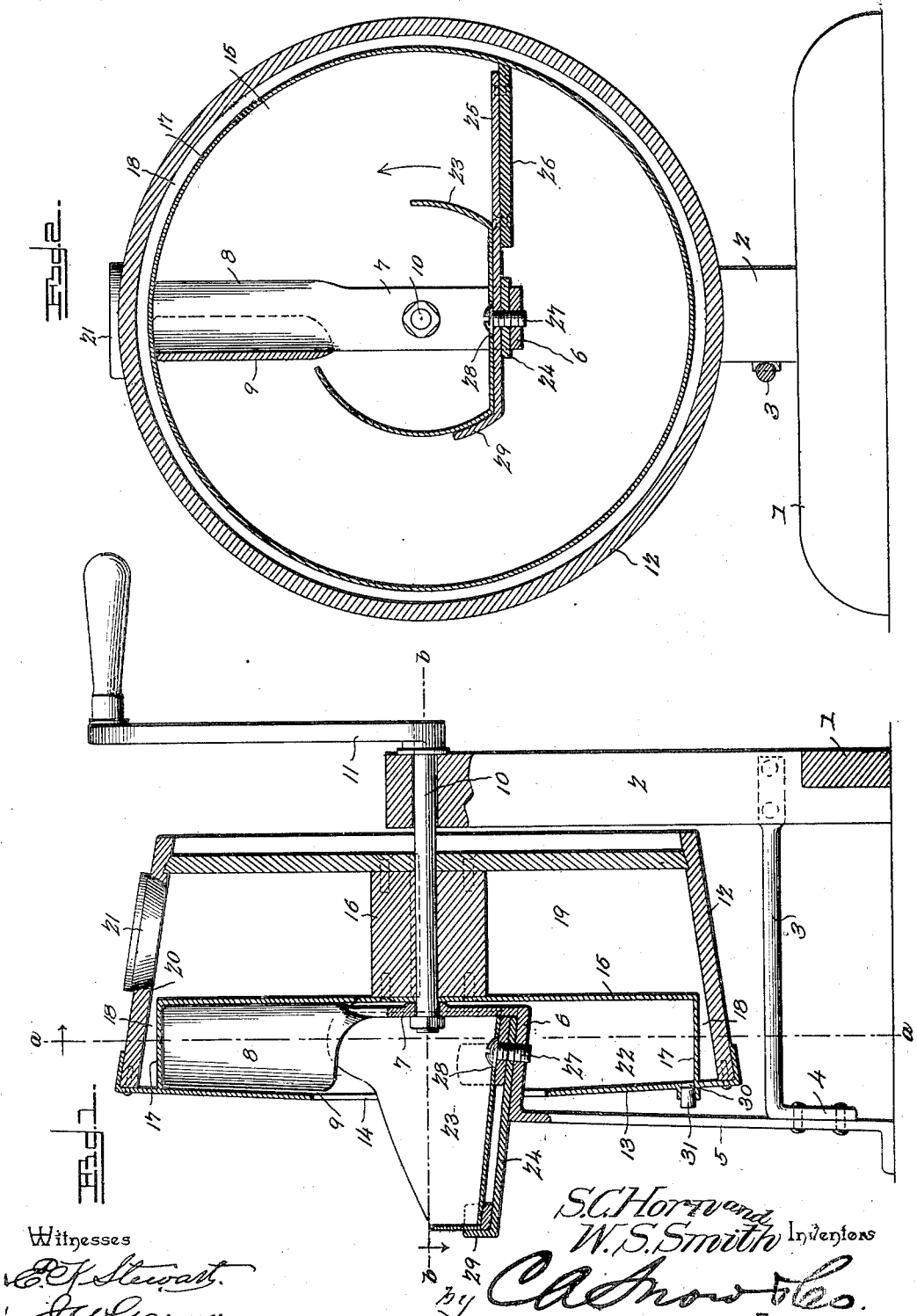

UNITED STATES PATENT OFFICE.

SCHOOLER C. HORN AND WILLIAM S. SMITH, OF BLADENSBURG, OHIO.

ICE-CREAM FREEZER.

SPECIFICATION forming part of Letters Patent No. 660,109, dated October 23, 1900.

Application filed July 11, 1900. Serial No. 23,256. (No model.)

*To all whom it may concern:*

Be it known that we, SCHOOLER C. HORN and WILLIAM S. SMITH, citizens of the United States, residing at Bladensburg, in the county of Knox and State of Ohio, have invented a new and useful Ice-Cream Freezer, of which the following is a specification.

Our invention is an improved ice-cream freezer, the object of our invention being to provide a freezer in which the cream or milk is rapidly frozen in a thin film on a freezing-disk, from which it is scraped by the revolution of the freezing-disk by a coacting knife which delivers the ice-cream to a removable receiving-tray.

Our invention consists in the peculiar construction and combination of devices hereinafter fully set forth, and pointed out in the claims.

In the accompanying drawings, Figure 1 is a vertical central sectional view of an ice-cream freezer embodying our improvements. Fig. 2 is a sectional view of the same, taken on the line *a a* of Fig. 1. Fig. 3 is a horizontal sectional view of the same, taken on the line *b b* of Fig. 1. Fig. 4 is a detail perspective view of the scraping-brush and the supports therefor and for the ice-cream tray. Fig. 5 is a detail perspective view of the shaving-knife. Fig. 6 is a detail perspective view of the removable ice-cream-receiving tray.

To the center of a horizontally-disposed foot 1 is secured a vertical standard 2. An arm 3, which is here shown as a metallic rod, is secured to the standard 2, extends forward therefrom, and has its outer end downturned, as at 4. To the downturned portion 4 of arm 3 is secured, by means of bolts, rivets, or other suitable means, a vertical standard 5, which is made of steel, is provided with an inward-extending downwardly-inclined lateral offset 6, and at the inner end of said lateral offset with an upwardly-extending vertical arm 7, with which is formed a shaving-knife 8. The rear side of the shaving-knife is extended and curved to form a deflecting-lip 9. A shaft 10 is journaled in a bearing near the upper end of the standard 2 and in a bearing formed in the vertical knife-arm 7. A crank 11 is attached to the outer end of the said shaft. A revoluble drum 12, which is vertically disposed, as herein shown, and is substantially in the form of a tub, is secured on the shaft 10 and rotates therewith. A plate 13 almost closes the outer side of the said drum, the said plate having a central opening 14 of suitable size. A freezing-disk 15, of iron, steel, or other suitable metal, rotates with the drum and is secured to the center thereof by a hub portion 16 on the shaft 10, and the outer rim of said freezing-disk is connected to the plate 13 by a flange 17, which is cylindrical in form. The diameter of the freezing-disk is somewhat less than the internal diameter of the drum, and thereby an annular space 18 is formed between the outer portion of the drum and the annular flange 17. It will be understood from the foregoing and by reference to the drawings that a chamber 19 is formed in the inner side of the drum between the vertical wall thereof and the freezing-disk 15, which chamber is the ice-chamber adapted to receive the crushed ice and salt, the same being placed therein through an opening 20, provided with a bung or other suitable closure 21. A milk or cream chamber 22 is formed between the freezing-disk and the outer plate 13. It will be understood that the milk or cream chamber is entirely disposed within the drum and that the inner surface of the freezing-disk and the lower portion of the annular flange 17 is exposed directly to the freezing action of the ice and salt in the chamber 19 and annular chamber 18, which communicates therewith, and hence that the disk 15 is rapidly reduced to a temperature below the freezing-point and that the milk or cream in the chamber 22 is rapidly brought to a temperature only slightly above the freezing-point. The surface of the milk or cream in contact with the freezing-disk is almost instantly frozen into a thin film, which by the rotation of the drum and freezing-disk in the direction indicated by the arrow in Fig. 2 is shaved off from the face of the freezing-disk by the cutting edge of the shaving-knife 8, which impinges against the freezing-disk, as shown. The shaving of ice-cream is by the curved deflecting-lip 9, with which the shaving-knife is provided, caused to drop therefrom in a continuous shaving onto the ice-cream-receiving tray 23, which is supported in the center of the cream or milk chamber and extends outward through the opening 14 in the outer plate 13.

A supporting-bracket 24 is secured on the offset 6 of the standard 5, and transversely disposed on the inner end of said supporting-bracket is an arm 25, which carries on its under side a brush 26, made of rubber or other suitable material, one side of which brush impinges against the inner side of the outer plate 13. The function of the said brush is to prevent the milk or cream from ascending on the outer plate 13 and dropping therefrom onto the ice-cream tray when the freezer is in operation. The ice-cream tray is supported on the bracket 24 and arm 25. A screw 27 secures the bracket 24 and the arm 25 on the offset 6, and the head of the said screw extends through an opening 28 in the bottom of the tray and serves to retain the latter on the said bracket and arm 25.

In the manufacture of our improved ice-cream freezer we make the bracket 24 and arm 25 integrally in a single casting; but the same may be made separately, if preferred. The said bracket and the said arm are provided with upturned lugs 29, which bear against the outer side of the ice-cream-receiving tray and retain the latter in place. It will be understood that the said tray may be readily removed from the supporting bracket and arm when it becomes filled with ice-cream. The milk or cream chamber 22 is provided with an opening 30 in the outer plate 13, by means of which the said chamber may be drained when necessary, and a cork or other suitable closure 31 is provided for the said opening.

Having thus described our invention, we claim—

1. A revoluble drum comprising an ice-chamber and a milk or cream chamber therein and revoluble therewith, said milk or cream chamber having a freezing-disk forming one side thereof, in combination with a stationary knife impinging against said freezing-disk, substantially as described.

2. A revoluble drum comprising an ice-chamber and a milk or cream chamber therein and revoluble therewith, said milk or cream chamber having a freezing-disk forming one side thereof, in combination with a stationary knife impinging against said disk, said knife having a deflecting-lip, substantially as described.

3. A revoluble drum comprising an ice-chamber and a milk or cream chamber therein and revoluble therewith, said milk or cream chamber having a freezing-disk forming one side thereof, in combination with a stationary knife impinging against said disk, and a receiving-tray, substantially as described.

4. The combination of a revoluble drum having an ice-chamber and milk or cream chamber divided by a freezing-disk, a standard forming one of the bearings for said drum and having a knife impinging against said freezing-disk, and a tray supported on said standard, substantially as described.

5. The combination of a revoluble drum having an ice-chamber and a milk or cream chamber divided by a freezing-disk, said milk or cream chamber having a central opening in its outer side, a knife, impinging against said freezing-disk, an ice-cream-receiving tray, extending through the opening in the outer side of said milk or cream chamber, and a support for said tray, substantially as described.

In testimony that we claim the foregoing as our own we have hereto affixed our signatures in the presence of two witnesses.

SCHOOLER C. HORN.
WILLIAM S. SMITH.

Witnesses:
WM. R. KERR,
JOHN M. BOGGS.